United States Patent

Yonemura

[11] Patent Number: 6,164,618
[45] Date of Patent: Dec. 26, 2000

[54] JOINING METHOD AND JOINING STRUCTURE AS WELL AS FORM FOR CONCRETE PRODUCTS

[75] Inventor: Masatsugu Yonemura, Kumamoto, Japan

[73] Assignee: Yamax Corporation, Kumamoto, Japan

[21] Appl. No.: 09/415,875

[22] Filed: Oct. 8, 1999

Related U.S. Application Data

[62] Division of application No. 08/983,630, filed as application No. PCT/JP96/02960, Oct. 14, 1996, Pat. No. 6,014,849.

[30] Foreign Application Priority Data

May 24, 1996 [JP] Japan ................................ 8-129952

[51] Int. Cl.⁷ .................................................. E04G 15/00
[52] U.S. Cl. .............. 249/35; 249/190; 404/47; 404/69; 52/396.02; 52/396.04; 52/464; 52/576
[58] Field of Search ............ 249/3, 8–9, 18–19, 249/21–22, 35, 40, 142, 187.1, 189, 190–193, 217; 264/31–35; 404/47–49, 68–69; 52/396.02–396.06, 371, 464, 576

[56] References Cited

U.S. PATENT DOCUMENTS

| | | |
|---|---|---|
| 1,617,527 | 2/1927 | Knight . |
| 1,641,147 | 9/1927 | Barton ......................................... 249/35 |
| 1,723,306 | 8/1929 | Sipe . |
| 2,593,456 | 4/1952 | James ......................................... 249/35 |
| 2,961,731 | 11/1960 | Buzzell et al. . |
| 3,018,703 | 7/1962 | Fujihara . |
| 3,754,729 | 8/1973 | Maynen ............................... 249/192 X |
| 3,801,061 | 4/1974 | Holt ........................................ 249/190 |
| 3,968,611 | 7/1976 | De Munck . |
| 4,423,979 | 1/1984 | Brown . |
| 4,740,404 | 4/1988 | Otsugu et al. . |
| 4,965,970 | 10/1990 | Nania . |
| 5,228,255 | 7/1993 | Hahn . |

FOREIGN PATENT DOCUMENTS

| | | |
|---|---|---|
| 54-111333 | 8/1979 | Japan . |
| 57-30537 | 7/1982 | Japan . |
| 57-127115 | 8/1982 | Japan . |
| 58-111276 | 7/1983 | Japan . |
| 2-6894 | 2/1990 | Japan . |
| 5-33487 | 2/1993 | Japan . |

*Primary Examiner*—Carl D. Friedman
*Assistant Examiner*—Winnie Yip
*Attorney, Agent, or Firm*—McDermott, Will & Emery

[57] ABSTRACT

The present invention relates to a joining method and a joining structure as well as a form for concrete products. A protruding portion provided at the front end of a seal member of elastic material attached to one concrete product is inserted through an opening formed in a joining face of the other concrete product into an attachment hole of enlarged diameter provided at a depth of the opening, while bringing a closing press contact portion of the seal member into press contact with inner surfaces of the opening to achieve an airtight condition inside the attachment hole, followed by filling grout into a space defined between inner surfaces of the attachment hole and the protruding portion and setting the grout there to join the concrete products together.

2 Claims, 10 Drawing Sheets us use from the point of view of design in consideration of the required strength and structure, resulting in a complicated designing. Likewise, with the conventional method as shown in FIG. 15, the selection of steel rods 52 and their assembly to the sleeve 53 and design have been complicated. In addition, both the joining methods have required lots of time and labor, leading to inefficiency in joining the concrete products A, B and an increase in construction costs, material costs and production costs.

JOINING METHOD AND JOINING STRUCTURE AS WELL AS FORM FOR CONCRETE PRODUCTS

This application is a divisional of application Ser. No. 08/983,630 filed Jan. 23, 1998, now U.S. Pat. No. 6,014,849 which is a 371 of International Patent Application No. PCT/JP96/02960, filed Oct. 14, 1996, which claims priority from Japanese Patent Application No. 8-129952, filed May 24, 1996.

Further, an O-ring, a rubber packing or the like has been used to prevent leakage of water between the concrete products A, B joined.

FIELD OF THE INVENTION

The present invention has been conceived in order to overcome the above deficiencies, and an object of the present invention is to provide a joining method and a joining structure as well as a form for concrete products, which enable an unskilled person to join concrete products together with a simple handling operation, which impart a structural firmness and a sufficient rigid connectivity as well as excellent earthquake resistant properties and water cutoff properties, and which are easy to produce and design and capable of reducing construction costs and material costs.

The present invention relates to a joining method and a joining structure as well as a form for concrete products for easily and reliably connecting together concrete products including, for example, construction materials such as concrete box culverts, side channels and U-shaped channels, and building materials such as outside wall panels and inside wall panels.

BACKGROUND OF THE INVENTION

DISCLOSURE OF THE INVENTION

A method of joining together at the laying side concrete products including construction materials such as box culverts, side channels and U-shaped channels must conventionally meet the requirements, (a) providing a rigid connectivity ensuring a structural integration of the concrete products; (b) providing a flexibility at the joining points of the concrete products in order to ensure earthquake resistant properties; and (c) providing water cutoff properties for preventing any leakage of liquid.

In order to attain the above object, a first invention of the present invention provides a joining method for concrete products comprising the steps of: inserting a protruding portion at a front end of a seal member of elastic material attached at a rear end to a joining face of one concrete product through an opening formed in a joining face of the other concrete product opposed to the one concrete product into an attachment hole of enlarged diameter provided at a depth of the opening; bringing a closing press contact portion provided rearwardly of the protruding portion into press contact with inner surfaces of the opening to keep an interior of the attachment hole airtight; and filling grout into a space defined between inner surfaces of the attachment hole and the protruding portion inserted into the attachment hole and setting the grout there to join the one and the other concrete products together by means of the seal member.

However, there have hitherto existed no joining methods that satisfy all the requirements (a) to (c) mentioned above.

Joining methods that merely provide the rigid connectivity of (a) above include the method as shown in FIG. 12, in which opposed joining faces 1, 1 of concrete products A, B are adhered to each other with an adhesive S of cement mortar, synthetic resin or the like.

Another joining method is illustrated in FIG. 13, in which joining faces 1, 1 of concrete products A, B are provided with respective, opposed projecting steel plates 50, 50, which are welded together to join the concrete products.

A second invention provides a joining method for concrete products, one of which includes a first attachment surface formed at a desired angle on a joining face thereof, and the other of which includes a second attachment surface formed at a desired angle on a joining face thereof, an opening formed in the second attachment surface and an attachment hole of enlarged diameter formed at a depth of the opening, the method comprising the steps of: inserting a protruding portion provided at a front end of a seal member of elastic material, which is at a rear end thereof attached to the first attachment surface, through the opening formed in the second attachment surface into the attachment hole; bringing a closing press contact portion provided rearwardly of the protruding portion into press contact with inner surfaces of the opening to keep an interior of the attachment hole airtight; and filling grout into a space defined between inner surfaces of the attachment hole and the protruding portion inserted into the attachment hole and setting the grout there to join the one and the other concrete products together by means of the seal member.

A third joining method is illustrated in FIG. 14, in which an appropriate number of steel rods 51 are provided between joining faces 1, 1 of concrete products A, B and at one end linked to one concrete product A and at the other end linked to the other concrete product B to join them together.

Further, a fourth joining method is illustrated in FIG. 15, in which steel rods 52, 52, a sleeve 53 and a filler 54 are used to connect the concrete products A, B together.

The conventional adhesive-using method as shown in FIG. 12, however, entails a deficiency that the joining points, when the concrete products A, B are joined together, are subject to stresses and thus to fracture.

The conventional method as shown in FIG. 13, in which the opposed steel plates 50, 50 projecting at the joining faces 1, 1 of the concrete products A, B are welded, entails a deficiency that it requires skill and lots of time and labor for the welding operation, resulting in an inefficient joining operation as well as an increase in construction costs. In addition, the steel plates 50, 50 are susceptible to corrosion.

A third invention provides the joining method according to the first or second invention, wherein the step of filling grout comprises filling the grout through and into the space which serves as an introduction passage for the grout, and which is defined between the inner surfaces of the attachment hole and the protruding portion provided at the front end of the seal member inserted into the attachment hole.

The conventional method as shown in FIG. 14 which uses steel rods 51 to join the concrete products A, B entails a deficiency that it involves the selection of the number of steel rods 51 to use and the positions where to provide the steel rods 51 as well as the thickness of the steel rods 51 to A fourth invention provides the joining method according to the first or second invention, wherein the step of filling grout comprises filling the grout through an introduction passage in communication with the attachment hole, which is provided internally of the seal member whose protruding portion at the front end is inserted into the attachment hole, into the space defined between the inner surfaces of the attachment hole and the protruding portion inserted into the attachment hole.

A fifth invention provides the joining method according to the second invention, wherein the step of inserting comprises inserting the protruding portion provided at the front end of the seal member from a direction substantially perpendicular to a joining direction of the concrete products into the attachment hole, and the step of filling grout comprises filling the grout, after completion of the insertion of the protruding portion into the attachment hole, from a direction substantially perpendicular to the joining direction of the concrete products into the space defined between the inner surfaces of the attachment hole and the protruding portion.

A sixth invention provides the joining method according to any one of the second to fifth inventions, wherein the seal member with the protruding portion formed at the front end which is inserted and fixed in the attachment hole provided at the depth of the opening formed in the attachment surface is provided at an outer side of the opposed concrete products.

A seventh invention provides the joining method according to any one of the second to fifth inventions, wherein the seal member with the protruding portion formed at the front end which is inserted and fixed in the attachment hole provided at the depth of the opening formed in the attachment surface is provided at an inner side of the opposed concrete products.

An eighth invention provides a joining structure for concrete products comprising: one and the other opposed concrete products each with a joining face; a seal member of elastic material attached to the joining face of the one concrete product and including a protruding portion at a front end thereof and a closing press contact portion provided rearwardly of the protruding portion; and an opening formed in the joining face of the other concrete product and an attachment hole of enlarged diameter provided at a depth of said opening, wherein the protruding portion of the seal member is inserted through the opening into the attachment hole, the closing press contact portion is brought into press contact with inner surfaces of the opening, and grout is filled into a space defined between inner surfaces of the attachment hole and the protruding portion inserted into the attachment hole and set to join the one and the other concrete products together by means of the seal member.

A ninth invention provides a joining structure for concrete products comprising: one and the other opposed concrete products each with a joining face, the one concrete product including a first attachment surface formed at a desired angle on the joining face thereof, the other concrete product including a second attachment surface formed at a desired angle on the joining face thereof, an opening formed in a tapered manner in section in the second attachment surface, and an attachment hole of enlarged diameter provided at a depth of and continuous to the opening; and a seal member of elastic material attached to the first attachment surface of the one concrete product and including a protruding portion at a front end thereof which is larger in diameter than a minimum dimension between inner surfaces of the opening and insertable into the attachment hole, and a closing press contact portion formed rearwardly of the protruding portion which elastically comes into press contact with the inner surfaces of the opening, wherein the protruding portion of the seal member is inserted into the attachment hole, and grout is then filled into a space defined between inner surfaces of the attachment hole and the seal member inserted into the attachment hole and is set to join the one and the other concrete products together by means of the seal member.

A tenth invention provides the joining structure according to the ninth invention, wherein the one and the other concrete products each has the opening formed in the respective attachment surface and the attachment hole at the depth of the respective opening, and the seal member is at opposite ends provided with the closing press contact portion and the protruding portion, wherein after positioning the protruding portions and the closing press contact portions in the respective attachment holes and the respective openings continuous to the attachment holes, grout is filled into spaces defined between the inner surfaces of the attachment holes and the protruding portions inserted into the attachment holes and is set to join the one and the other concrete products together by means of the seal member.

An eleventh invention provides the joining structure according to the eighth or ninth invention, wherein the opening is tapered toward the attachment hole of enlarged diameter provided at the depth of the opening, and a narrow part is formed at a boundary between the attachment hole and the opening.

A twelfth invention provides the joining structure according to the eighth or ninth invention, wherein the closing press contact portion is formed on a tapered inclined portion of the seal member which is of such height as to be capable of comming into press contact with the inner surfaces of the opening.

A thirteenth invention provides the joining structure according to any one of the eighth to tenth inventions, wherein the closing press contact portion has locking tongues formed in a serrated manner on at least one of upper and lower surfaces thereof, which tongues are capable of coming into press contact with the inner surfaces of the opening.

A fourteenth invention provides a form for concrete products comprising a hole-forming male loose piece of elastic material such as rubber or synthetic resin set at a desired position on an inner surface of the form.

A fifteenth invention provides the form according to the fourteenth invention, wherein the loose piece of elastic material comprises a tapered base portion with an attachment seat formed at a rear end thereof, and a male protruding portion of enlarged diameter provided at a front end of the base portion.

A sixteenth invention provides the form according to the fifteenth invention, wherein the male protruding portion has a hollow portion formed therein for permitting expansion or contraction of the male protruding portion.

BEST MODE TO CARRY OUT THE INVENTION

An exemplary embodiment of the present invention will now be described with reference to the accompanying drawings.

Referring to FIGS. 1 to 5, a joining method and a joining structure as well as a form for concrete products according to one embodiment of the present invention will be described in detail.

Figure 1:
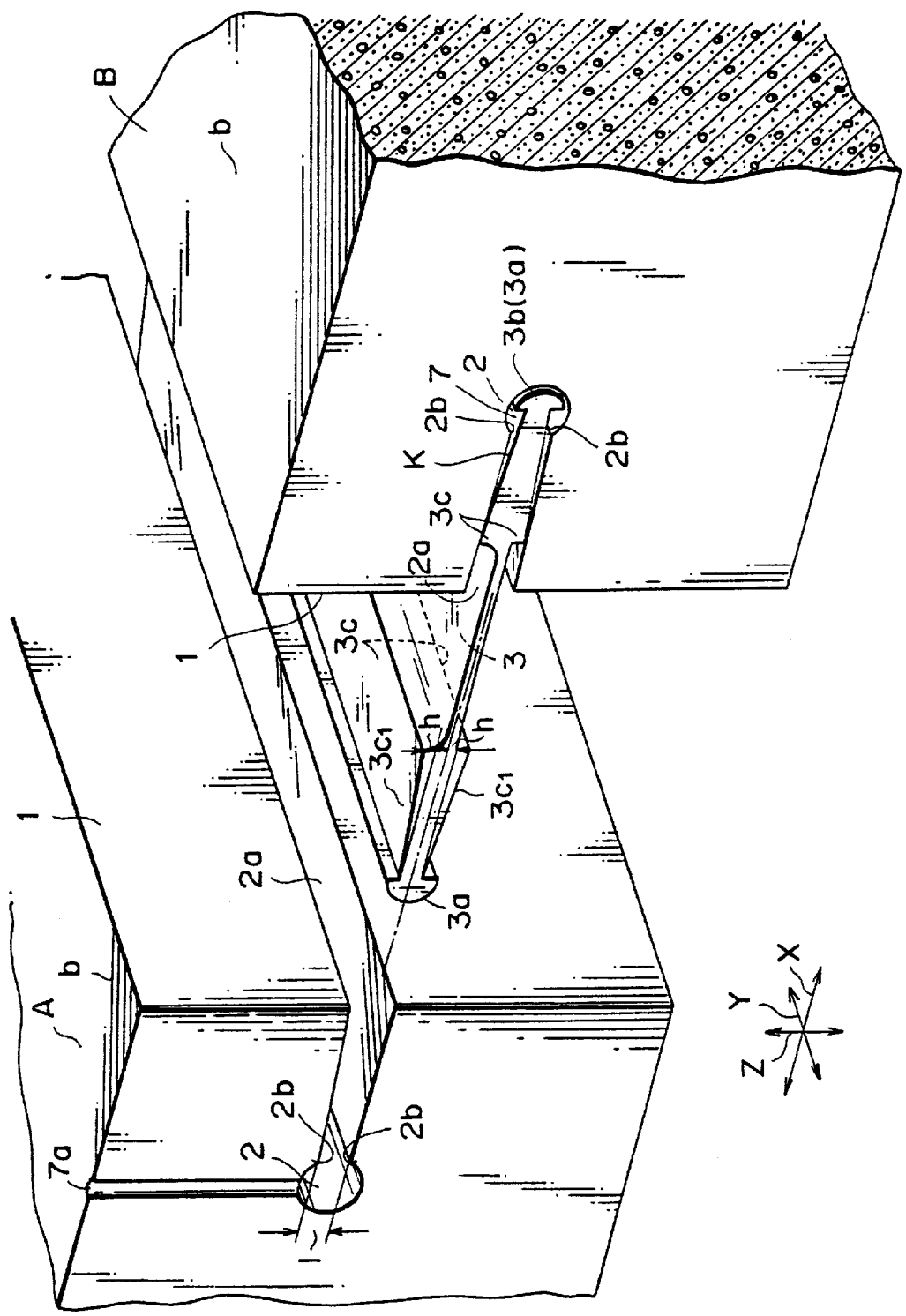
FIG. 1 is an enlarged partial perspective view of a first embodiment of a joining method and a joining structure for concrete products in accordance with the present invention.
Figure 2:
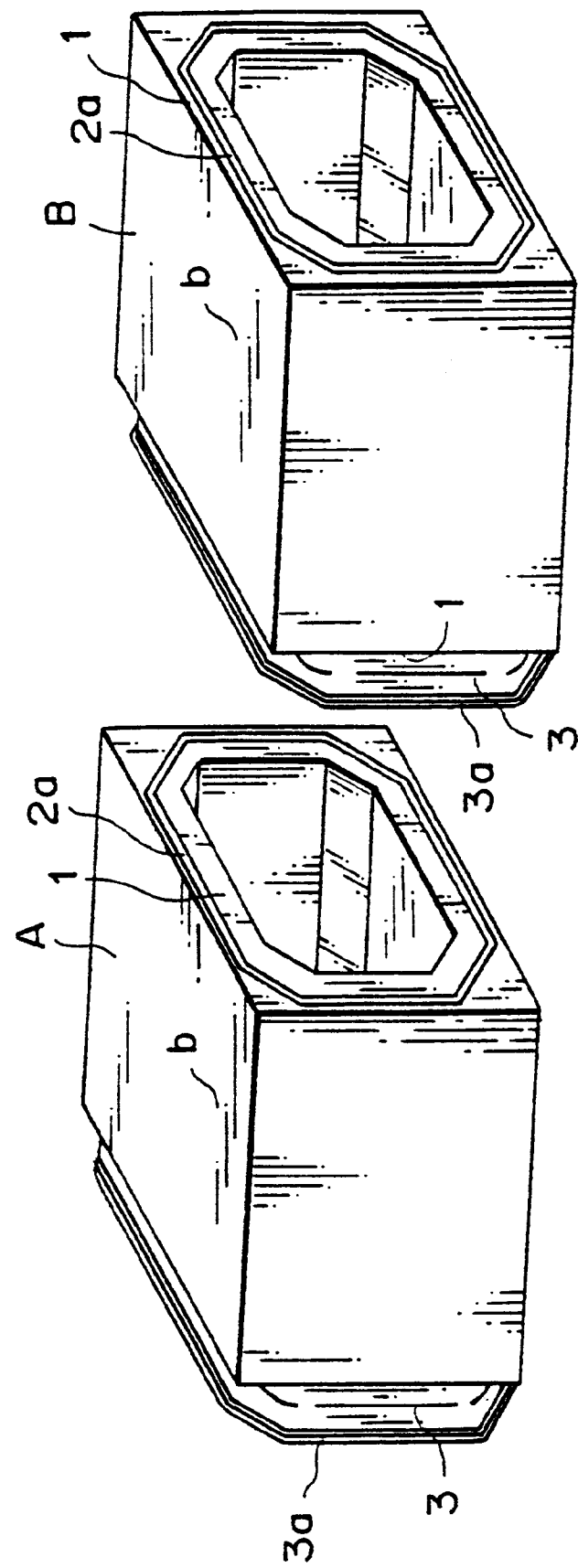
FIG. 2 is a perspective view of concrete products in the form of box culverts about to be connected.
Figure 3:
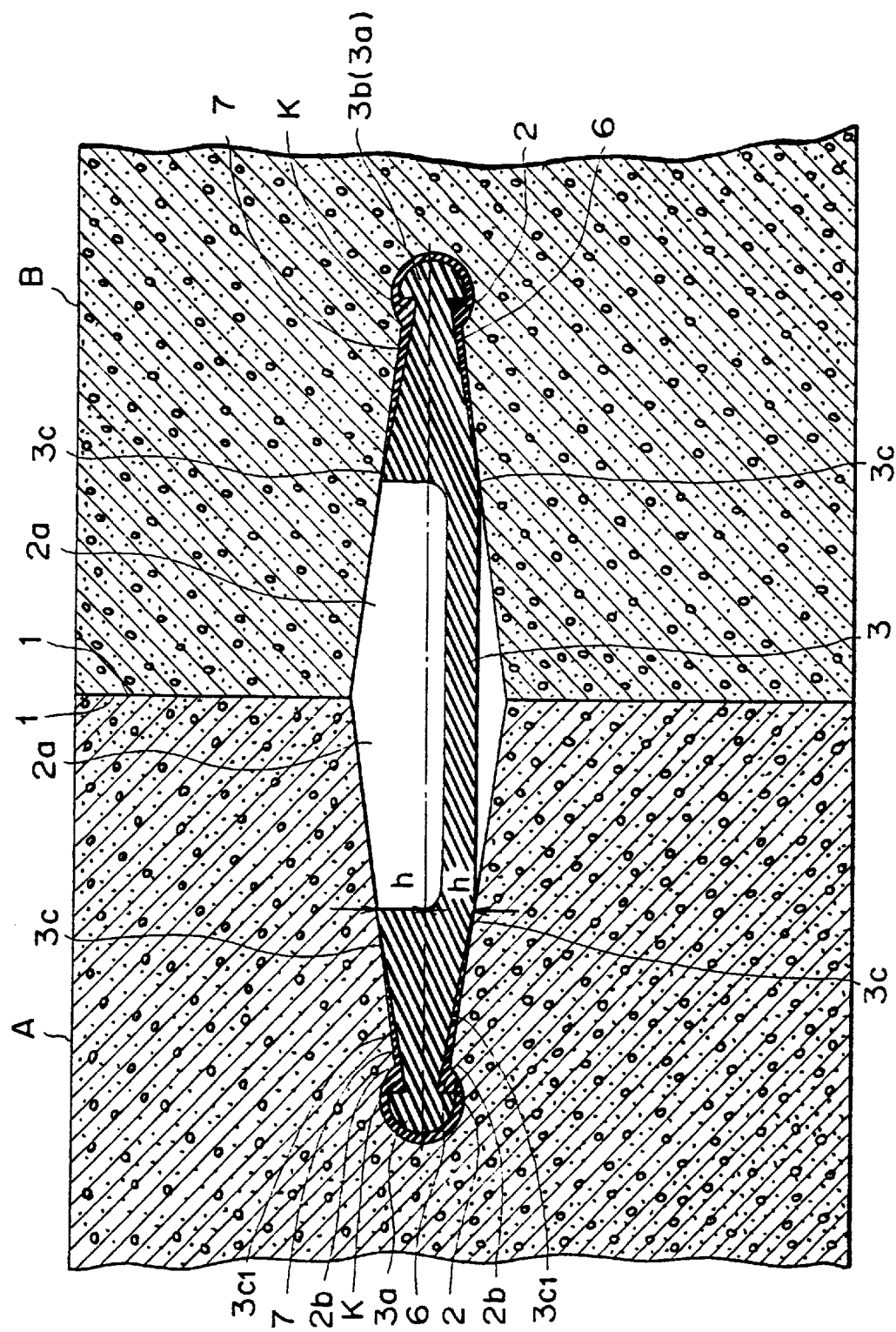
FIG. 3 is an enlarged section of the concrete products joined together by means of a seal member.

Referring to FIGS. 1 and 2, A and B denote concrete products to be joined together which, in this embodiment, take the form of box culverts b, b as shown in FIG. 2. These products A, B have opposed joining faces 1, 1 which come into contact with each other at the time of juncture.

At least one of the concrete products A and B to be joined together includes an opening 2a provided substantially circular in front view in the joining face 1. The opening 2a leads to an attachment hole 2 having as shown substantially a circular section of an enlarged diameter, which is for receipt therein of a protruding portion 3a formed at the front end of a seal member 3.

The opening 2a is tapered in section toward the enlarged diameter attachment hole 2 provided at the inner part and has a narrow portion or neck 2b at the boundary between the attachment hole 2 and the opening 2a. Denoted 1 is a minimum dimension between inner walls of the opening 2a.

Figure 4:
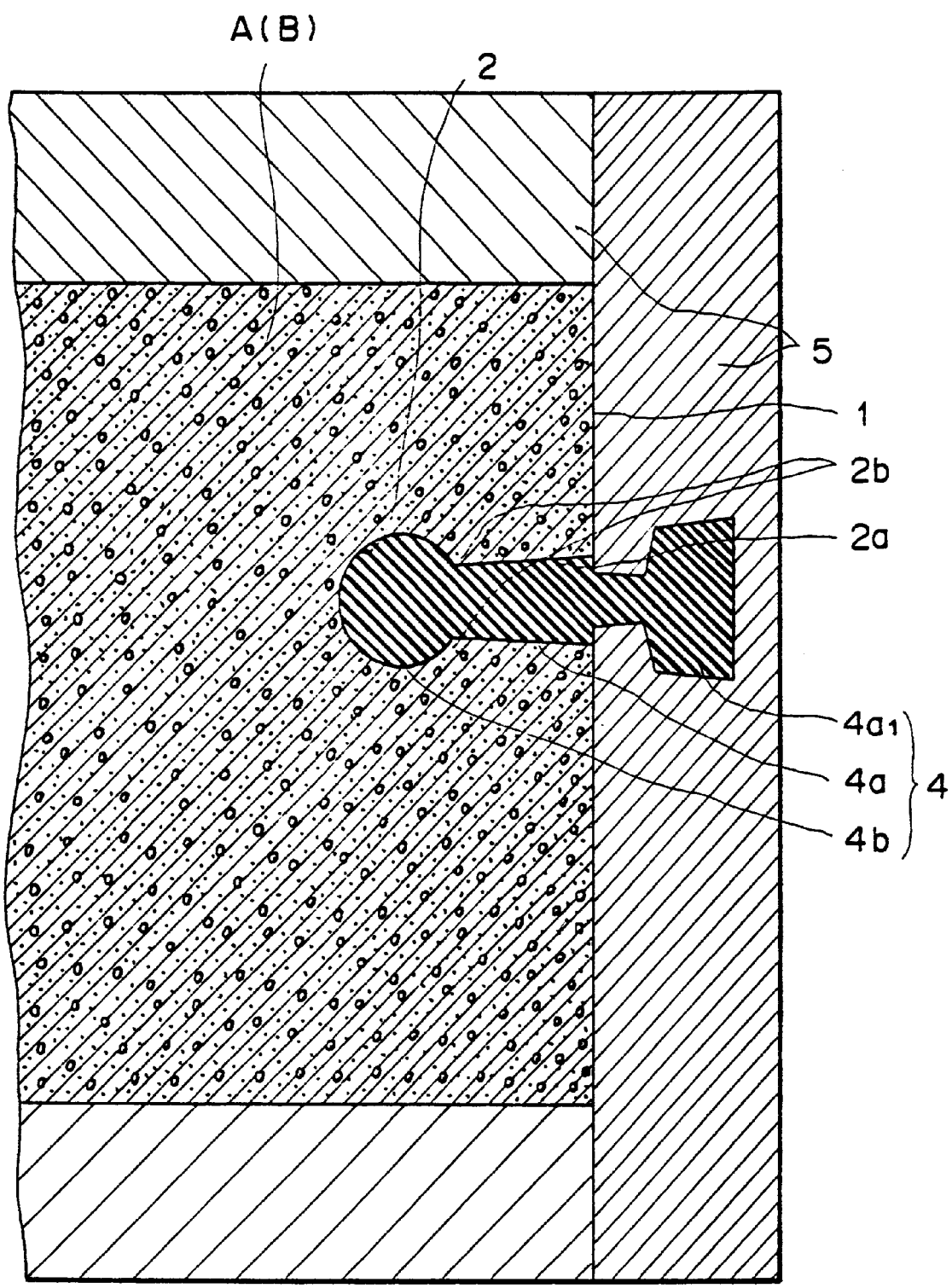
FIG. 4 is an enlarged section of an example of a form for concrete products in accordance with the present invention.

To form the attachment hole 2 in the concrete product A, B, a hole-forming male elastic loose piece 4 made of elastic material such as rubber or synthetic resin, for example, is attached at a desired position on an inner surface of a concrete form 5 as shown in FIG. 4. The elastic loose piece 4 consists of a tapered base portion 4a with an attachment seat $4a_1$ at the rear end and a male protruding portion 4b of an enlarged diameter formed at the front end of the base portion 4a.

To form a concrete product with the attachment hole 2, concrete is filled into the form 5, set and thereafter released, at which time the elastic loose piece 4 is elastically scaled down to be easily pulled out from the concrete product attachment hole 2 through the neck 2b to provide the attachment hole 2 and the tapered opening 2a continuous thereto.

Figure 5:
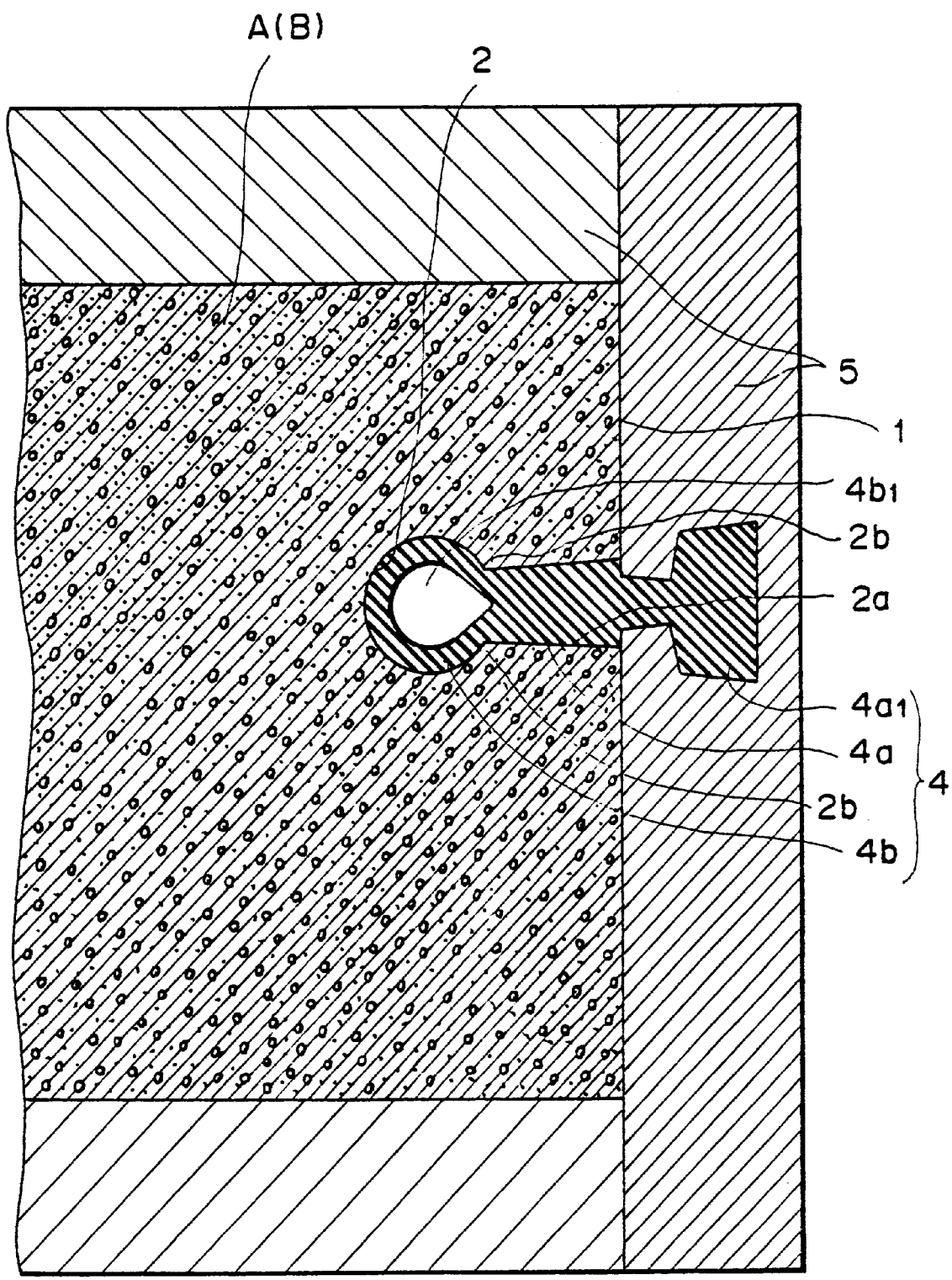
FIG. 5 is an enlarged section of another example of a form for concrete products in accordance with the present invention.

With the structure as shown in FIG. 5 in which the male protruding portion 4b is internally provided with a hollow portion $4b_1$ which scales up or down on release or application of a pressing force, the male protruding portion 4b can, at the time of releasing the concrete product, be more easily pulled out of the attachment hole 2 through the neck 2b than with the one as shown in FIG. 4.

The seal member 3 is formed of elastic material and is at the rear end 3b attached to the other concrete product B and has, for example, the protruding portion 3a at the front end.

In this embodiment, the seal member 3 is at both the ends provided with the swelled protruding portions 3a, 3a each having substantially a semi-circular section as shown. The elastic materials for forming the seal member 3 include, for example, not only rubber or synthetic resin but also braided inorganic fibers such as glass fibers, carbon fibers. Denoted 3c are closing press contact portions located rearwardly of the protruding portions 3a, which closing press contact portions 3c are formed on tapered inclined portions $3c_1$, $3c_1$ of such a height h as to come into press contact with inner surfaces of the openings 2a when the seal member 3 is inserted into the opening 2a. When the closing press contact portion 3c is thus brought into contact with inner surfaces of the opening 2a, an airtight condition is achieved inside the attachment hole 2 and the opening 2a.

Denoted K is a space defined between inner surfaces of the attachment hole 2 and the protruding portion 3a of the seal member 3 inserted into the attachment hole 2. When grout 6 has been filled into the space K and set, the concrete products A and B are interconnected by means of the seal member 3.

As the grout 6, for example a non-shrinkable cement mortar is preferably used, but liquid rubber, sythetic resin or the like is also usable. The grout 6 is filled from outside the concrete product A into the space K which serves as an introduction passage 7 defined between the protruding portion 3a provided at the front end of the seal member 3 and inner surfaces of the attachment hole 2, and is set. Denoted 7a is an introduction port leading to the introduction passage 7. The grout 6 is filled through the introduction port 7a into the space K in the concrete product A, B by means of a filling machine.

X represents a direction in which the concrete products A, B are joined together, Y represents a direction horizontally intersecting the joining direction X, and Z represents a direction vertically intersecting the joining direction X.

The joining structure for concrete products according to one embodiment of the present invention is constructed as described above. Description will now be made of a method of joining the concrete products A and B, along with its operative function in the sequence of steps.

To join together at a laying site the concrete products A, B in the form of box culverts b, b in the present embodiment, the protruding portion 3a at the front end of the seal member 3—which is at the rear end 3b attached to the joining face 1 of one concrete product B—is first inserted in the joining direction X through the opening 2a provided substantialy circular in front view in the joining face 1 of the other concrete product A into the attachment hole 2 (see FIGS. 1 and 2). The protruding portion 3a provided at the front end of the seal member 3 is thus positioned inside the substantially circular in section attachment hole 2, at which time the tapered closing press contact portion 3c located rearwardly of the protruding portion 3a comes into contact with inner surfaces of the opening 2a to keep the interior of the attachment hole 2 airtight.

Further, when the protruding portion 3a is positioned inside the attachment hole 2, the space K is defined around the periphery of the protruding portion 3a in the attachment hole 2 to form the introduction passage 7 continuous to the interior of the opening 2a.

The grout 6 is then filled through the introduction port 7a and the introduction passage 7 into the space K defined between inner surfaces of the attachment hole 2 and the protruding portion 3a inserted into the attachment hole 2, and is set. At that time, the grout 6 is filled by means of a filling machine (see FIG. 3). As the grout 6, a non-shrinkable cement mortar is preferably used, but liquid rubber or synthetic resin is also usable.

Then, when the grout 6 is filled into the space K and set, the swelled protruding portion 3a of the elastic material-made seal member 3 positioned inside the substantially circular in section attachment hole 2 formed in the concrete product A is fixed in a watertight manner in the the attachment hole 2 due to the setting of the grout 6.

At that time, due to the fact that the protruding portion 3a at the front end of the seal member 3 positioned inside the substantially circular in section attachment hole 2 has substantially a semi-circular section, and that the narrow neck 2b is formed at the boundary between the attachment hole 2 and the tapered opening 2a continuous to the attachment hole 2, the protruding portion 3a is firmly fixed inside the attachment hole 2 due to the grout 6 filled in the space K. The neck 2b prevents the protruding portion 3a from coming out of the attachment hole 2, leading to a sufficient rigid connectivity.

Thus, the end of the seal member 3 is securely and structurally firmly attached to the concrete product A, so that the concrete products A, B in the form of box culverts are joined together by means of the elastic material-made seal member 3.

Although in the illustrated example the attachment hole 2 is shown substantially circular in section, the shape is not limited thereto, and the attachment hole 2 may have a triangular, rectangular, pentagonal or hexagonal section. Likewise, the protruding portion 3a inserted into the attachment hole 2 is shown substantially semi-circular in section to define thereround in the attachment hole 2 the space k serving as the introduction passage 7, but the shape is not limited thereto and may be substantially a circular, triangular, rectangular, pentagonal or hexagonal section.

In short, it suffices if the protruding portion 3a is swelled relative to the main portion of the seal member 3 and is of such a desired shape as to define the space K, when inserted into the attachment hole 2, between it and inner surfaces of the attachment hole 2.

Because the seal member 3 is made of elastic material such as rubber, synthetic resin, metal or a braid of glass fibers or carbon fibers, when an external force resulting from an earthquake or the like is applied to the concrete products A, B joined, the seal member 3 located at their joining points exerts its flexibility, providing a high follow-up ability to and high absorbing properties of the external force. Thus, unlike the conventional joining method in which the adhesive S is used to join the concrete products A, B, the joining points of the concrete products A, B do not break under stresses, leading to improved earthquake resistant properties. In addition, because the protruding portion 3a provided at the end of the seal member 3 is inserted and locked in the attachment hole 2 in such a manner as to provide watertightness, leakage of liquid can be reliably prevented, leading to improved water cutoff properties.

Further, in the present embodiment, in order to attach the rear end of the seal member 3 to the joining face 1 of the product B, as is the case with the attachment of its front end, the substantially semi-circular in section protruding portion 3a provided at the rear end of the seal member 3 is inserted through the opening 2a provided circular in front view in the joining face 1 of the product B into the attachment hole 2 while bringing the closing press contact portion 3c located rearwardly of the protruding portion 3a into press contact with inner surfaces of the opening 2a and attaining an airtight condition inside the attachment hole 2, followed by filling the grout 6 into the space K defined between inner surfaces of the attachment hole 2 and the protruding portion 3a and setting the same. The means of attaching the seal member 3 to the concrete product B, however, are not limited to the above and include a not-shown anchor of appropriate form which is embedded for the mentioned purpose in the product B and other appropriate fixing means such as adhesion, screwing or the like.

Figure 6:
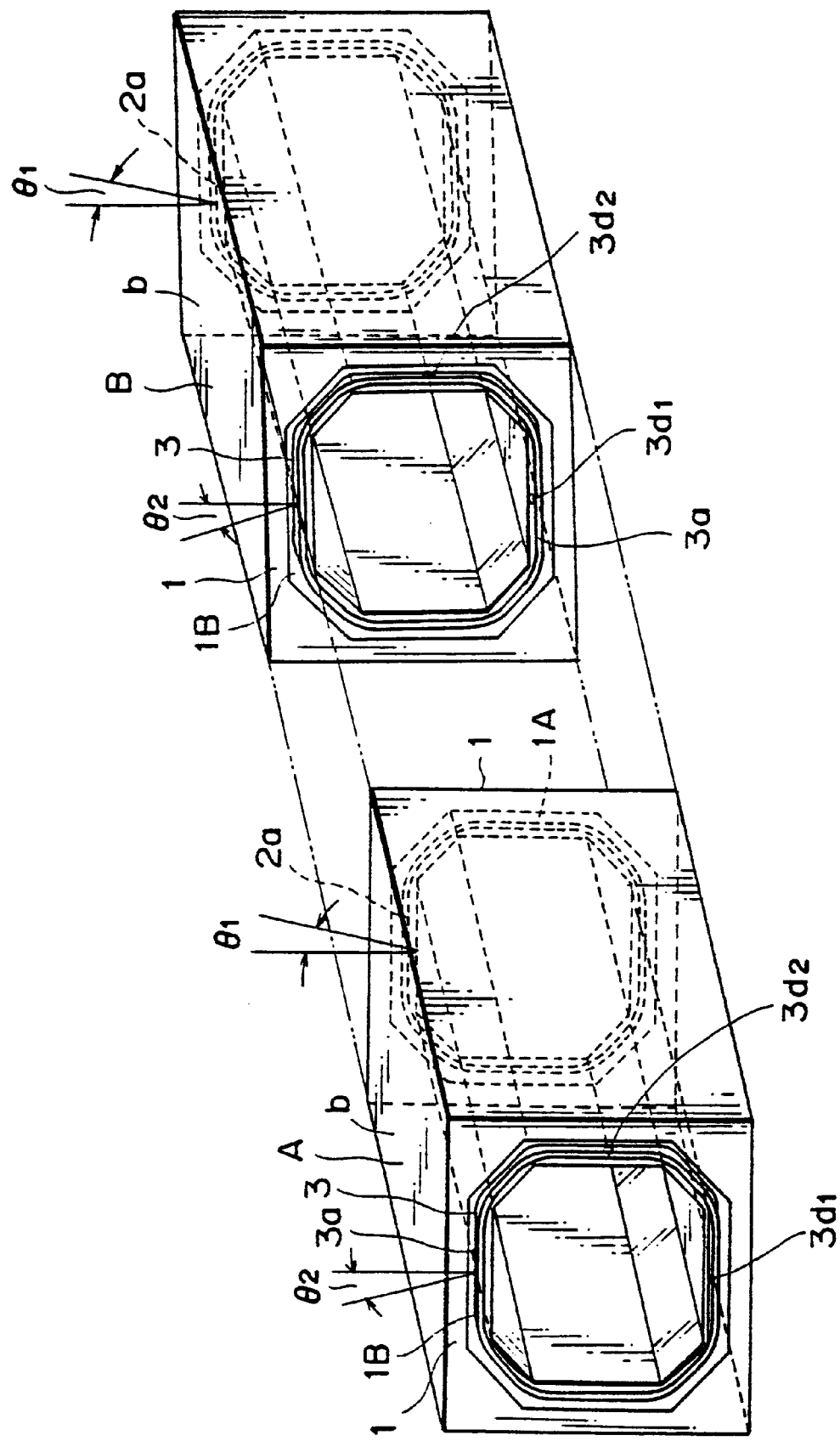
FIG. 6 is a perspective view of concrete products in the form of box culverts in accordance with a second embodiment of the present invention, about to be connected.
Figure 7:
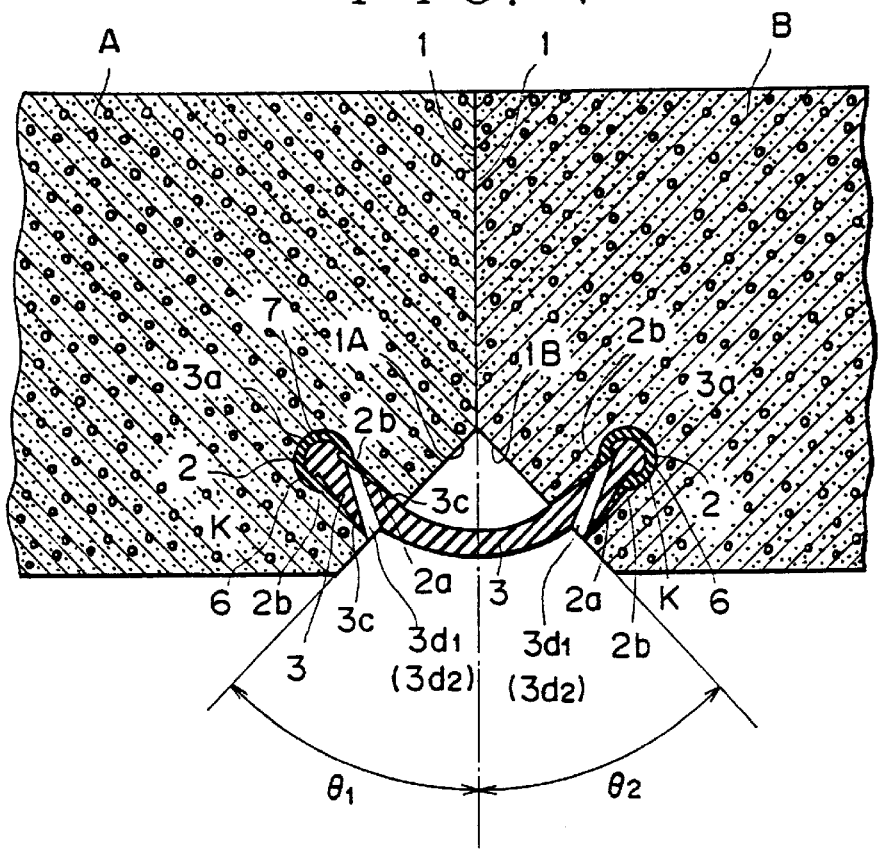
FIG. 7 is an enlarged section of the box culverts joined together by means of a: seal member.

FIGS. 6 and 7 show a joining structure for concrete products according to a second embodiment of the present invention.

In this embodiment, of the concrete products A and B in the form of box culverts b, b to be joined together, one concrete product A has an attachment surface 1A formed at a desired angle of $\theta_1$ at the side of and relative to the joining face 1. Likewise, the other concrete product B to be joined to the one concrete product A has an attachment surface 1B formed at a desired angle of $\theta_2$ at the side of and relative to its joining face 1, to which attachment surface 1B is attached the rear end of the seal member 3.

The opening 2a is formed substantially circular in front view at least in the attachment surface 1A of the one concrete product A, and the attachment hole 2 is provided at a depth of the opening 2a.

As the desired angle $\theta_1$, $\theta_2$ of the attachment surface 1A, 1B relative to the joining face 1, 1, an appropriate one is selected which facilitates the joining operation of the concrete products A, B by means of the seal member 3, serves to prevent the protruding portion 3a of the seal member 3 from coming off the attachment hole 2 after completion of the joining of the concrete products A, B, and serves to achieve sufficient water cutoff properties. The angle in the present embodiment is most preferably in the range, for example, of 30° to 60°.

Designated $3d_1$ is an introduction port for the grout 6, which opens at one end to the outside at the rear of the closing press contact portion 3c and extends in section slantingly axially of the seal member 3 to communicate at the other end to the introduction passage 7. The grout 6 is filled into the introduction passage 7 through the introduction port $3d_1$.

Designated $3d_2$ is a filler checking hole for checking the filled condition of the grout 6, which opens at one end to the outside at the rear of the closing press contact portion 3c and extends in section slantingly axially of the seal member 3 to communicate at the other end to the introduction passage 7. The filler checking hole $3d_2$ may be provided in plural as desired. The grout 6 is checked from outside through the filler checking hole $3d_2$ which is thereafter closed with a not-shown pin pressed therein.

To join together the concrete products A, B in the form of box culverts b, b, the protruding portion 3a provided at one end of the seal member 3—which is attached to the attachment surface 1B of one concrete product B formed at the desired angle $\theta_2$ relative to the joining face 1—is first inserted through the opening 2a in the attachment surface 1A of the other concrete product A formed at the desired angle $\theta_1$ relative to the joining face 1 into the attachment hole 2. The closing press contact portion 3c provided rearwardly of the protruding portion 3a then comes into press contact with inner surfaces of the opening 2a to make the interior of the attachment hole 2 airtight. The grout 6 such as a non-shrinkable cement mortar is then filled from outside through the introduction passage between inner surfaces of the attachment hole 2 and the protruding portion 3a into the space K defined between inner surfaces of the attachment hole 2 and the protruding portion 3a, and is set to fix the protruding portion 3a inside the attachment hole 2 and join the concrete products A, B together by means of the seal member 3.

Because in this embodiment the opening 2a continuous to the attachment hole 2 is provided in the attachment surface 1A, 1B formed at the desired angle $\theta_1$, $\theta_2$ in the range, for example, of 30° to 60° at the side of and relative to the joining face 1, 1 of the concrete product A, B, the insertion and mounting of the protruding portion 3a of the seal member 3 in the attachment hole 2 is readily effected to lead to an easy and reliable joining of the products A, B, and the opening 2a and the protruding portion 3a are prevented from being aligned in a straight line to secure the protruding portion 3a inside the opening 2a to attain sufficient water cutoff properties.

In this second embodiment, as described above, the attachment surface 1A, 1B of the concrete product A, B to be joined together is provided at the desired angle $\theta_1$, $\theta_2$ at the side of the joining face 1, 1; the opening 2a is formed substantially circular in front view in the attachment surface 1A, 1B and the protruding portion 3a at the front end of the seal member 3 is inserted through the opening 2a into the attachment hole 2 located at a depth of the opening 2a; the grout 6 is filled into the space K in the attachment hole 2 through the introduction port $3d_1$ provided in the seal member 3 so as to open at one end to the outside at the rear of the closing press contact portion 3c and at the other end communicate to the introduction passage 7; and an appropriate number of the filler checking holes $3d_2$ are provided in the seal member 3 so as to open at one end to the outside at the rear of the closing contact portion 3c and at the other end communicate to the introduction passage 7, through which the filled condition of the grout 6 in the introduction passage 7 is checked during its filling and which are, after completion of the filling of the grout 6, closed with the not-shown pins pressed into their one end opening to the outside to set the grout 6 and join the products A, B together by means of the seal member 3 located therebetween. The position where to set the attachment surface 1A, 1B, however, is not limited to the side of the opposed joining faces of the concrete products A, B, and the attachment surface 1A, 1B may be provided externally on the concrete products A, B at the desired angle $_1$, $_2$. In this case, the insertion of the protruding portion 3a through the opening 2a—which is provided substantially circular in front view in the above attachment surface 1A, 1B—into the attachment hole 2 located at a depth of the opening 2a can be effected while checking from outside its being inserted. The grout 6 is thereafter filled into the space K as in the preceding embodiment and set to join the concrete products A, B together by means of the seal member 3 provided externally thereon.

Figure 8:
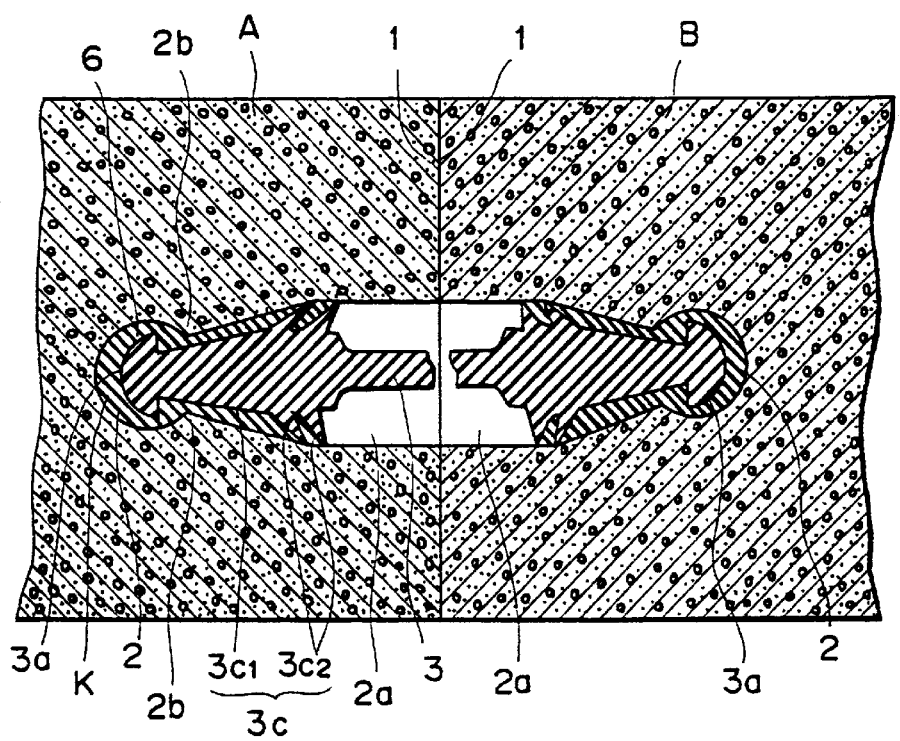
FIG. 8 is an enlarged partial section of a third embodiment of a joining method and a joining structure for concrete products in accordance with the present invention.

FIG. 8 shows a third embodiment of the present invention. In this embodiment, the closing press contact portion 3c of the seal member 3 located rearwardly of the protruding portion 3a has a plurality of locking tongues $3c_2$ formed on at least one of its upper and lower surfaces, in the illustrated example on both its upper and lower surfaces, the plurality of locking tongues $3c_2$ coming into press contact with inner surfaces of the opening 2a on inserting the protruding portion 3a of the seal member 3 through the opening 2a into the attachment hole 2, so that the grout 6 is filled into the space K defined between inner surfaces of the attachment hole 2 and the protruding portion 3a under a satisfactory airtight condition achieved inside the attachment hole 2 and set to join together the concrete products A, B by means of the seal member 3.

Figure 9:
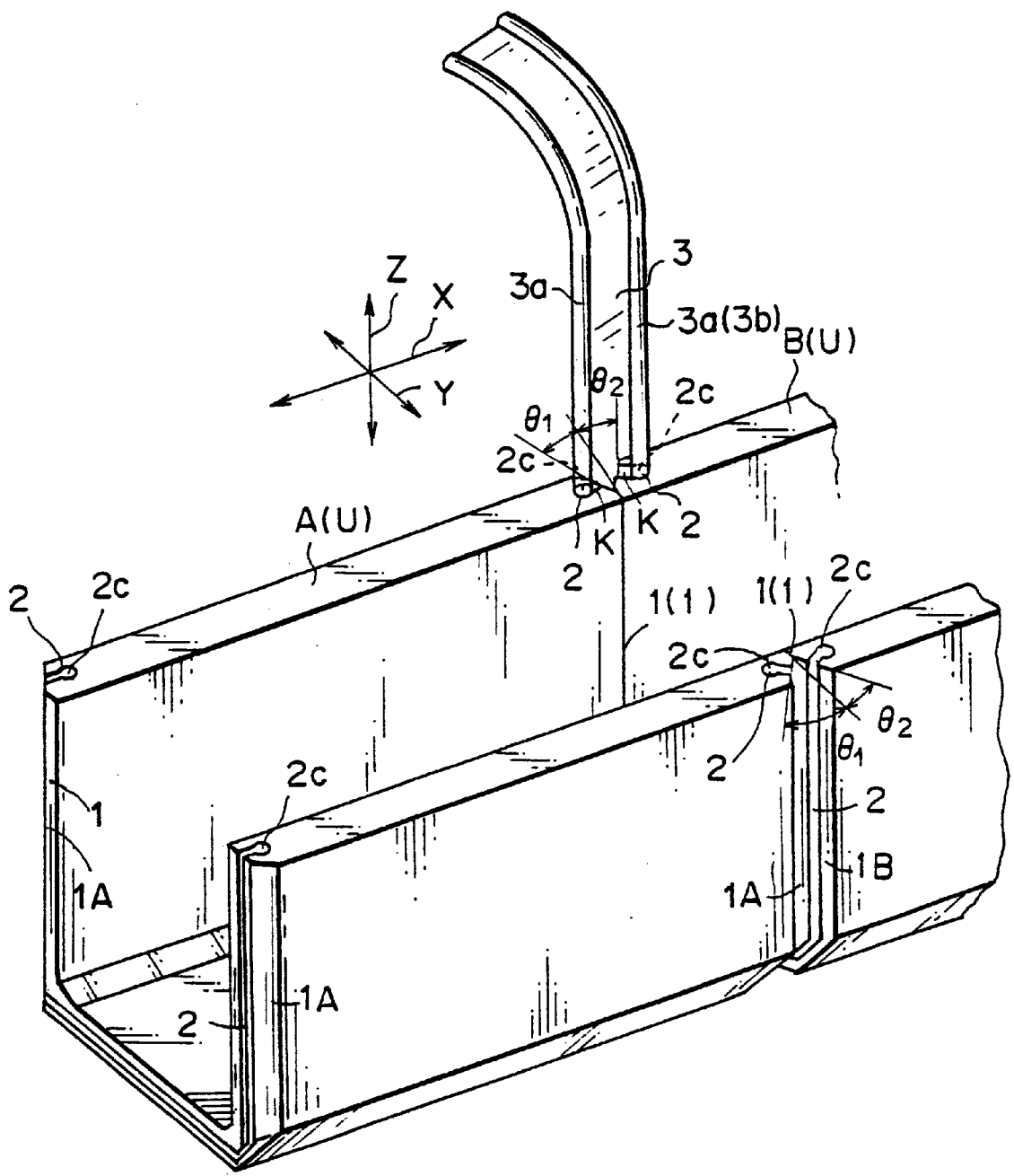
FIG. 9 is a perspective view of a fourth embodiment of the present invention showing a joining method and a joining structure for concrete products in accordance with the present invention applied to U-shaped channels.
Figure 10:
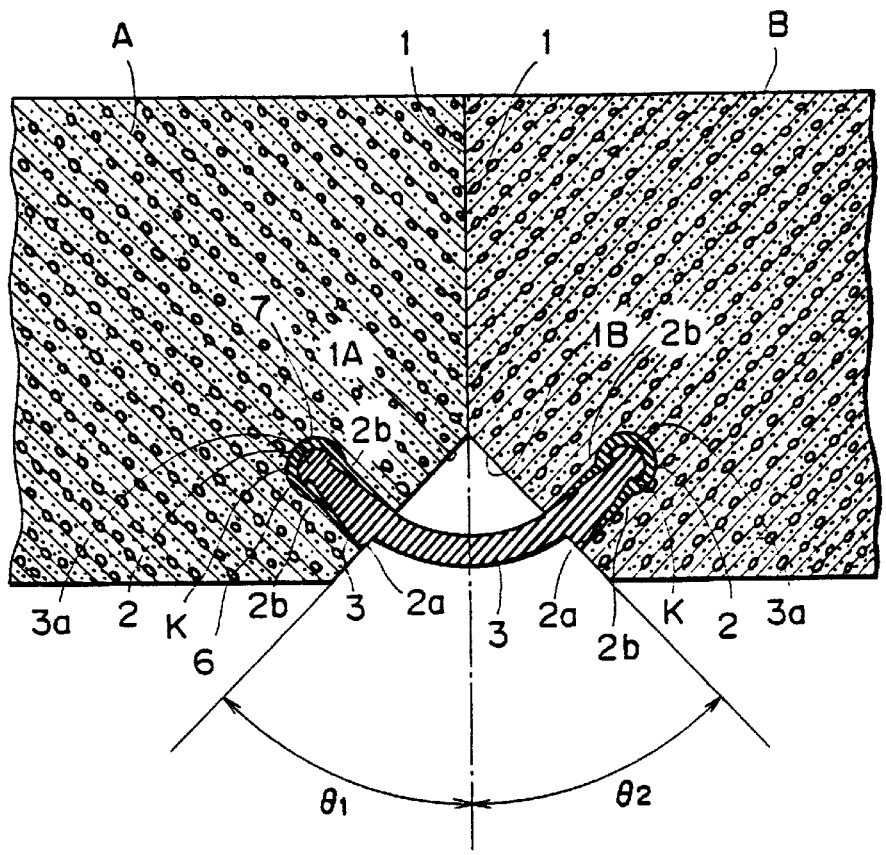
FIG. 10 is an enlarged section of the above concrete products connected together.

FIGS. 9 and 10 show a fourth embodiment of the present invention.

The present invention is in this embodiment applied to joining together concrete products A, B in the form of side channels or U-shaped channels U, U in place of the concrete products A, B in the form of box culverts 1, 1 as in the first embodiment. The concrete products A, B in this embodiment include respective attachment surfaces 1A, 1B formed at the desired angles $\theta_1$, $\theta_2$ relative to their joining faces 1, 1, and attachment holes 2, 2 having side openings 2c, 2c at their both left and right ends.

The seal member 3 is inserted through one of the side openings 2c, 2c—which is selected in consideration of the site conditions, laid condition of the side channels and the like—into the attachment hole 2 from the direction Z intersecting the joining direction X of the concrete products A, B.

Thus, because the protruding portion 3a of the seal member 3 can be inserted into the attachment hole 2 from not only the joining direction X of the concrete products A, B, but also from the direction Z vertically intersecting the joining direction X or the direction Y horizontally intersecting the joining direction X, the insertion operation of the seal member 3 is facilitated. The grout 6 is then filled into the space K defined between the inner surfaces of the attachment hole 2 and the protruding portion 3a and set to fix the protruding portion 3a of the seal member 3 in position. In this case, after insertion of the protruding portion 3a into the attachment hole 2, one of the side openings 2c, 2c of the attachment hole 2 is filled and closed with a filler such as rubber, synthetic resin or cement mortar to achieve an airtight condition inside the space K, so that the grout 6 can be filled into the space K and set.

Figure 11:
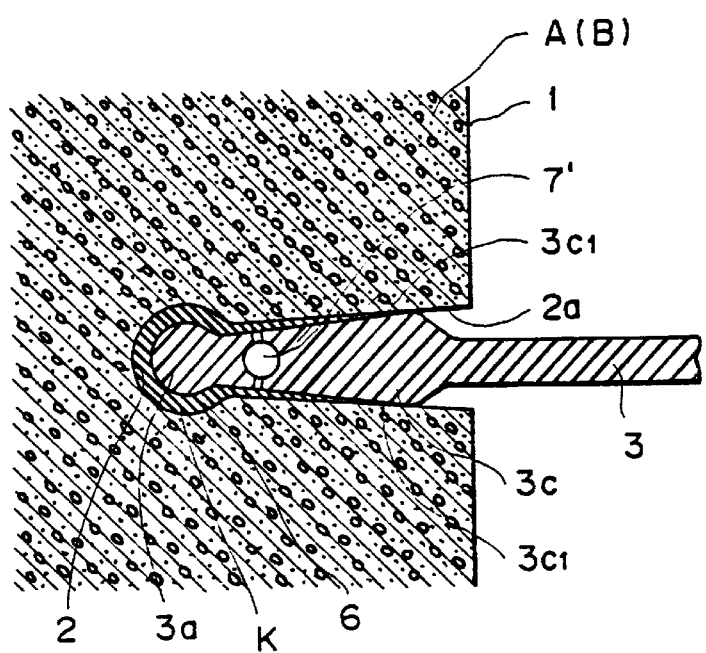
FIG. 11 is an enlarged section of a fifth embodiment of the present invention showing a concrete product being connected.
Figure 12:
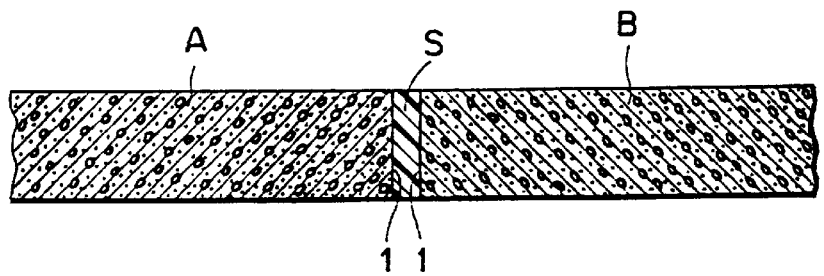
FIG. 12 is a section of a first conventional joining method in which concrete products are joined together with an adhesive.
Figure 13:
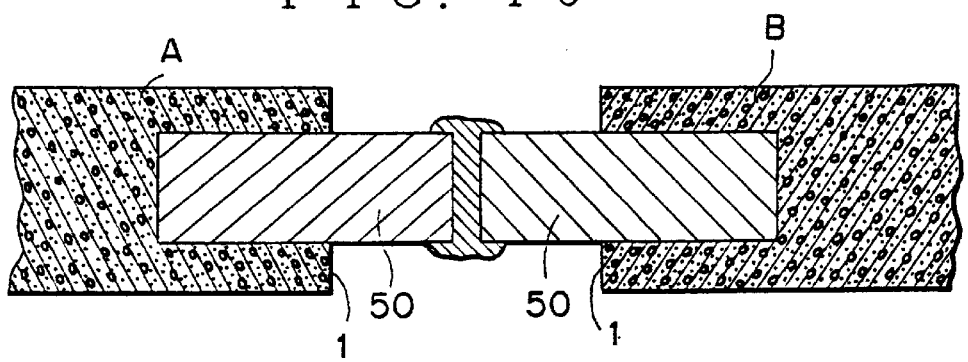
FIG. 13 is a section showing a second conventional joining method in which steel plates provided projecting on the joining faces of concrete products are welded to join the concrete products together.
Figure 14:
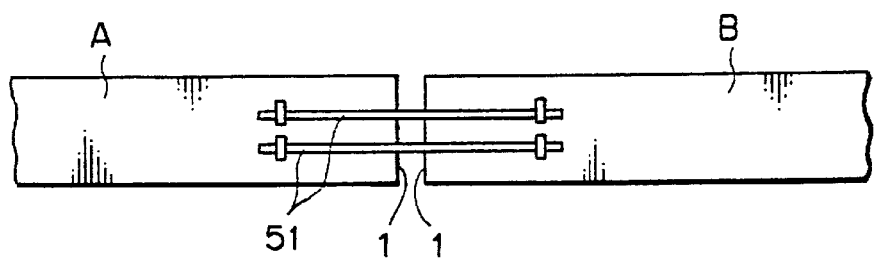
FIG. 14 is a section showing a third conventional joining method in which steel rods are connected to both the concrete products to be joined together.
Figure 15:
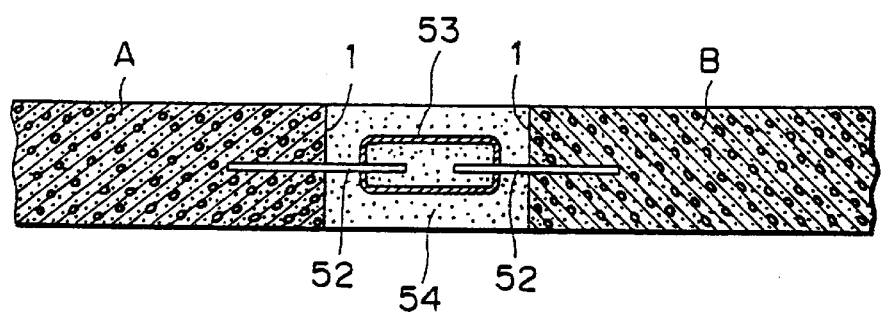
FIG. 15 is a section showing a fourth joining method in which a sleeve and steel rods are used to join concrete products together.

FIG. 11 shows a fifth embodiment of the present invention.

In this embodiment, the protruding portion 3a of enlarged diameter provided at the front end of the elastic material-made seal member 3, unlike the preceding examples in which it has a semi-circular section, has a regular circular section smaller than that of the attachment hole 2. Further, the seal member 3 is internally provided with an introduction passage 7' which extends in a width direction thereof and communicates to the attachment hole 2. The grout 6 is filled through this introduction passage 7' into the space K defined between the inner surfaces of the attachment hole 2 and the protruding portion 3a and set to fix the protruding portion 3a of the seal member 3 in the attachment hole 2 and join the concrete products A and B together by means of the seal member 3.

In the illustrated example, one introduction passage 7' is provided extending in the width direction of the seal member 3 and is at the front end provided with branches opening to the upper and lower surfaces of the seal member 3 and putting the same in communication with the attachment hole 2. This, however, is an example, and the introduction passage 7' is not limited in number to one and may be provided in plural. In addition, the front end of the introduction passage 7' may be extended to either one of the upper and lower surfaces of the seal member 3 for the filling of the grout 6 into the space K.

Incidentally, also in the third embodiment shown in FIG. 8 and the fifth embodiment shown in FIG. 11, as in the second embodiment shown in FIGS. 6 and 7, the seal member 3 may be provided with introduction ports $3d_1$ for the grout 6 and an appropriate number of filler checking holes $3d_2$, so that the filling of the grout 6 into the space K between inner surfaces of the attachment hole 2 and the protruding portion 3a of the inserted seal member 3 can be effected while checking the grout 6 being filled into the space K.

INDUSTRIAL APPLICABILITY OF THE INVENTION

As described hereinabove, according to the present invention, the protruding portion at the front end of the elastic-material made seal member attached to one concrete product is inserted into the attachment hole of enlarged diameter provided at a depth of the opening formed in the other concrete product, while bringing the closing press contact portion provided rearwardly of the protruding portion into press contact with inner surfaces of the opening to achieve an airtight condition in the attachment hole. The grout is then filled into the space defined between the inner surfaces of the attachment hole and the inserted protruding portion and set. The above permits even an unskilled person to securely join concrete products together with a simple handling operation. Further, because the protruding portion is fixed in the attachment hole by the grout filled in and set in the spcace defined between inner surfaces of the attachment hole and the protruding portion, the concrete products are structurally firmly joined together and have a rigid connectivity, and are excellent in earthquake resistant properties and water cutoff properties. Further, the present invention contributes to a simple production and design, leading to a reduction in construction costs and material costs.

What is claimed is:

1. A form for concrete products comprising a hole-forming male loose piece of elastic material set at a desired position on an inner surface of said form, wherein said loose piece of elastic material comprises a base portion which tapers and extends outwardly from said inner surface of said form and a male protruding portion of enlarged diameter provided at a front end of said base portion, said base portion having a thickness which increases away from said protruding portion, an attachment seat formed at a rear end of said base portion, and said attachment seat being disposed within said form.

2. The form for concrete products according to claim 1, wherein said male protruding portion has a hollow portion formed therein for permitting expansion or contraction of said male protruding portion.

* * * * *